May 2, 1950     W. R. PERRET ET AL     2,506,431
PRESSURE MEASURING DEVICE
Filed March 6, 1945                           2 Sheets-Sheet 1
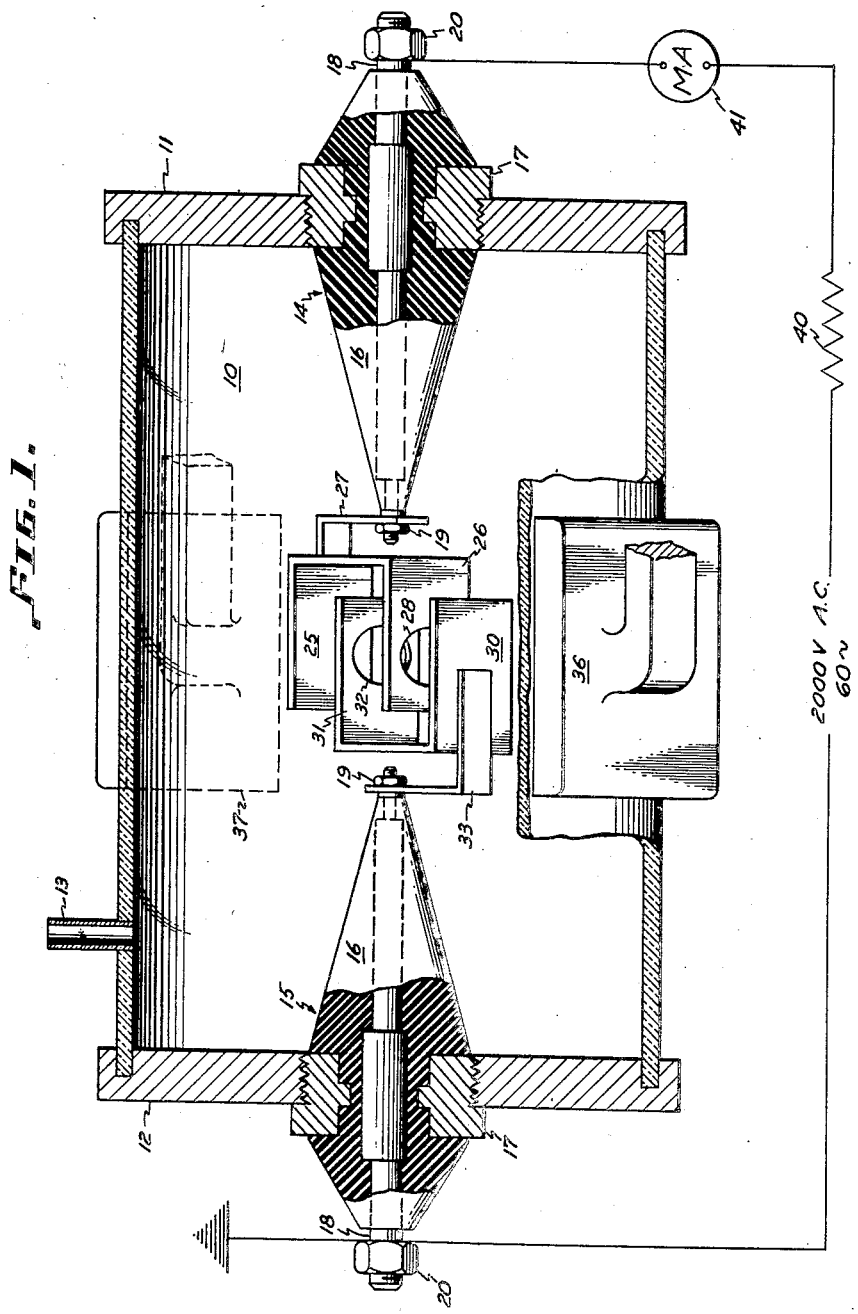
INVENTOR.
Thomas Davis
William R. Perret
BY
Robert A. Lavender May 2, 1950   W. R. PERRET ET AL   2,506,431
PRESSURE MEASURING DEVICE
Filed March 6, 1945   2 Sheets-Sheet 2
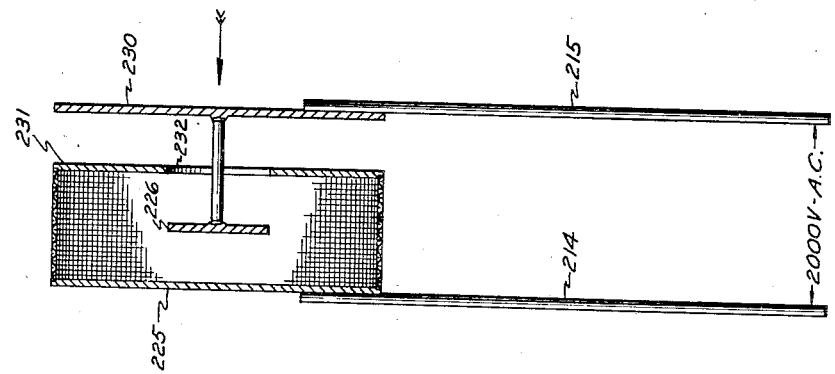
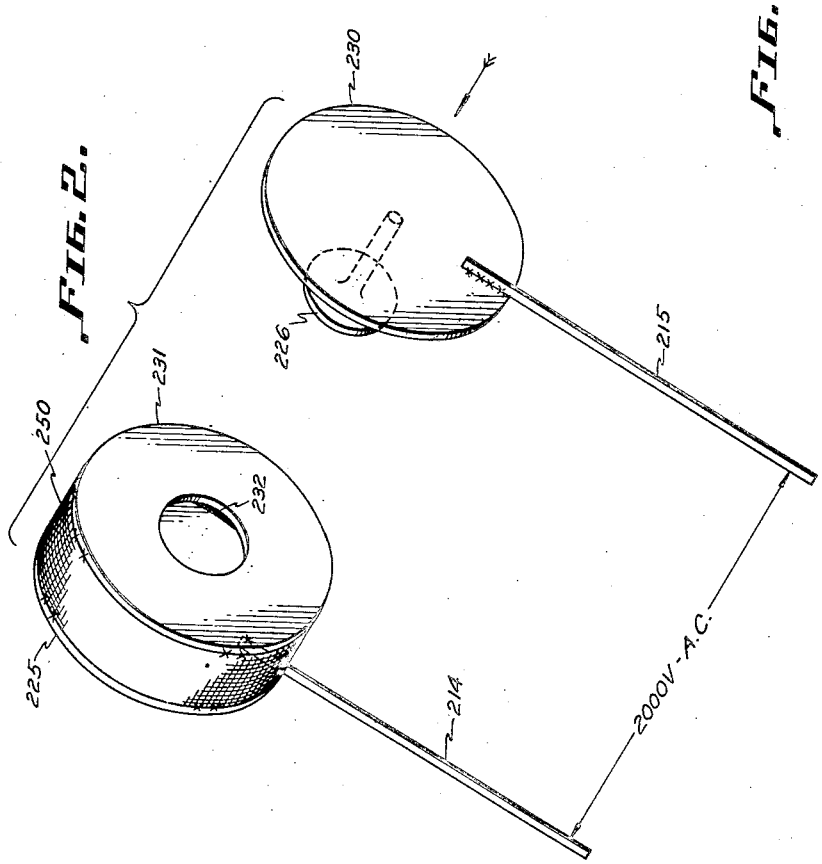
INVENTOR.
Thomas Davis
William R. Perret
BY
Robert A. Lavender Patented May 2, 1950

2,506,431

UNITED STATES PATENT OFFICE 2,506,431

PRESSURE MEASURING DEVICE

William R. Perret and Thomas Davis, Oak Ridge, Tenn., assignors, by mesne assignments, to the United States of America as represented by the United States Atomic Energy Commission Application March 6, 1945, Serial No. 581,260

17 Claims. (Cl. 175—183)

This invention relates to measurement of pressure and particularly of low pressures of gases of the order of 0.01 micron of mercury or less. Very low gaseous pressures are rather difficult to measure accurately, and our invention consists in an improvement in a particular type of pressure measuring device for extremely low pressures whereby the accuracy of the instrument is improved, and it is enabled to measure pressure accurately in lower ranges.

Our invention is related to, and is an improvement in, that particular type of pressure measuring device which has heretofore been used and which consists in its most usual form in a pair of plane cathode plates with a ring-shaped anode between the plates and disposed in a magnetic field, the direction of the magnetic field being parallel to the common perpendicular to the electrodes and with a potential impressed between the cathode plates and anode. In the past this type of gauge has been operated on both D. C. and A. C. potential. A. C. potential is advantageous in that alternating currents are easier to amplify, and thus the gauge can be more accurate and is more adaptable to very low pressure. However, in heretofore known alternating current gauges the current is only a half wave current since ordinarily the gauge will not conduct on "ring-negative" half cycles since on these half cycles the space between the plates is swept clean of charge, and there is no conduction.

An object of our invention is to provide a gauge of the general type described which is so constructed and arranged that the gauge will be conductive on both half cycles of the applied A. C. potential. The full wave current produced is easier to amplify, and the gauge is thus more accurate and is more adaptable to lower pressure ranges. This is particularly true since an ordinary half cycle A. C. gauge becomes inaccurate and unreliable at pressures of the order of 0.01 or 0.02 micron because such a gauge fails to conduct on all "ring positive" half cycles at pressures of this order, whereas the gauge of our invention, being a full wave device is less susceptible to this fault.

Another object of the invention is to provide a pressure-measuring device comprising cathode means and means forming two anodes with means for impressing an A. C. potential on the electrodes in such a way that the anodes are opposite in polarity, the arrangement being such that a discharge in the space between the cathode means and one or the other anode can exist during any part of the cycle of the impressed A. C. potential, and so that firing on the positive half cycle of each anode induces firing on the positive half cycle of the other.

Another object of the invention is to provide a pressure-measuring device consisting of a series of plane electrodes arranged in parallel relationship, certain of the electrodes constituting cathodes and having a potential impressed thereon, and two of the intermediate electrodes having openings therethrough and having potentials of opposite polarity impressed thereon, and all of the electrodes being disposed in a magnetic field in a direction parallel to the common perpendicular to the electrodes.

Another object of the invention is to provide a pressure-measuring device consisting of four plane electrode plates lying in parallel planes and being arranged in interleaving relationship, the two intermediate electrodes having circular aligned openings therein and alternate electrodes being electrically connected, with an A. C. potential impressed between the electrically connected pairs of electrodes, all of the electrodes being disposed in a magnetic field which is in a direction parallel to the common perpendicular to the electrodes.

Another object of the invention is to provide a device as in the previous objects wherein one of the electrodes which acts as an anode is a plate having an opening therethrough and the other electrode which acts as an anode is a plate or disc of substantially the same size as the opening.

Further objects and numerous advantages of our invention will become apparent from the following detailed description and the annexed drawing, Fig. 1 of which is a view partly in section of one form of the apparatus of our invention.

Fig. 2 is a view of a modified form of electrode construction and geometry.

Fig. 3 is another view of the modification of Fig. 2.

Referring to Fig. 1, numeral 10 designates a cylindrical glass tube or chamber the ends of which are sealed by end plugs or plates 11 and 12. The interior of chamber 10 is evacuated of air to a low pressure through an evacuating tube 13. Extending through the end plate 11 is a spark plug 14, and extending through the end plate 12 is a similar spark plug 15. Spark plug 14 comprises a body portion 16 made of insulating material as is conventional in the construction of spark plugs. The body portion is supported by a screw threaded plug member 17 which engages with the plate 11 in screw threaded relationship as shown. A stud or electrode 18 extends entirely through the spark plug body member and the ends of the stud 18 are screw threaded and engaged on the inner end is a nut 19 and on the outer end is a nut 20. The spark plug 15 is of identical construction, and its parts are identified by corresponding numerals.

Each of the spark plugs supports a pair of electrode plates within the chamber 10. The spark plug 14 supports electrode plates 25 and 26 by means of a bracket 27 which fits over the stud 18 and is held in place by the nut 19. The electrode plates 25 and 26 are substantially square and are parallel to each other, and the plate 26 has a circular opening 28 therein. The spark plug 15 supports two similar plates 30 and 31, the plate 31 having a circular opening 32 therein similar to the opening 28 and being axially aligned therewith. The plates 30 and 31 are supported by a bracket 33 from the spark plug 15. The plates 30 and 31 are parallel to the electrode 25 and 26 and are in interleaving relationship therewith. That is, the plate 31 is interleaved between plates 25 and 26, and the plate 26 is interleaved between the plates 30 and 31.

Numerals 36 and 37 designate the pole faces of a permanent magnet which is outside the chamber 10, and these pole faces are plane and are parallel to the electrode plates 25, 26, 30, and 31. The magnetic field of the permanent magnet is in a direction parallel to the common perpendicular to the electrode plates, and the center of the pole faces is coaxial with the aligned axes of the openings 28 and 32 in the plates 28 and 31. Any magnetic field of suitable strength and direction can be used.

An A. C. potential of 2,000 volts and a frequency of 60 cycles is connected between the spark plugs 14 and 15 as shown, and the spark plug 15 is grounded as shown. The potential is applied through a fixed resistance 40 and through a microammeter 41.

The operation of the gauge is somewhat similar although not entirely the same as gauges of this general type which have heretofore been used, but which ordinarily had only one electrode having a ring-like construction, that is, having a circular opening therethrough with reference to the magnetic field. The general operation of gauges of this type having only a single ring-like electrode is described in detail in the patent of F. M. Penning, No. 2,197,079. It will be seen that the plates 25 and 26 are connected to the one side of the circuit, and the plates 30 and 31 are connected to the other side. The polarity of the plates 26 and 31 is therefore opposite. These plates can be said for purposes of description to constitute anodes and plates 25 and 30 can be said to constitute cathodes. The operation of the "half" of the gauge comprised by plates 25, 26 and 31 will first be described. In operation, free electrons between the plates 25 and 26 will find their way to the plate 31. Under the influence of the magnetic field and the electric field existing in the vicinity of the plates, some of the electrons are caused to oscillate through the hole 32 and in addition will have a cycloidal procession around the axis of the aligned openings. As a result of the field, the distance of travel of the electrons will be considerably greater than if the magnetic field were absent, in which case they would move directly to the anode. Due to this increased distance of travel of electrons the probability of ionizing collisions will reach plate 31, this plate sufficiently to produce a discharge at low pressures. The discharge will in general be in a direction between the plates 25 and 26 through the opening 32 in the plate 31. Electrons comprising the discharge between plates 25 and 26 under the influence of the field and by reason of ionizing collisions will react plate 31, this plate being of opposite polarity so that when plate 31 is positive a current will be conducted. The "half" of the gauge comprised of plates 30, 31, and 26 operates exactly the same as the other "half," that is, when plate 26 is on its positive half cycle a current will flow, the total resultant current being a full wave current and the discharge of one "half" serving to initiate the discharge on the other "half," or that is, cause it to fire. That is, the ionization from firing on one "half" induces firing on the other "half." The discharge is therefore continuous.

As previously described, in heretofore known devices of this general type, the gauge is non-conducting on "ring-negative" half of cycles of the gauge since on these half cycles the ring, that is, the space within the anode member, is swept clean of charge. Conduction is only on "ring-positive" half cycles. The geometry of the electrode members of our device is such that one of the anode members 26 or 31 is always at a positive potential, that is, these members are of opposite polarity with one positive and the other negative and vice versa. The arrangement of the electrodes is such that it is symmetrical, and particularly it is significant that the cathode-anode arrangement is symmetrical with reference to the polarity of the impressed potential throughout the cycle, each "half" of the gauge forming part of the other "half." In other words, when either one of the anode plates 26 or 31 is on its "ring-positive" half cycle, the relationship of that plate to its adjacent plates is exactly the same, and this is true with reference to polarity. That is, the polarity of plate 31 is opposite to the polarity of its adjacent plates, and the polarity of plate 26 is opposite to the polarity of its adjacent plates. From the foregoing it is to be seen therefore that the juxtaposition of electrodes is such that throughout the cycle of the impressed potential, the same geometry of electrodes with reference to the polarity is presented. That is, there is always an anode element at a positive potential which is opposite in polarity to the electrode plates on its opposite sides, the anodes being adjacent each other so that ionization in the vicinity of one assists ignition with reference to the other. The desirable result of the arrangement is that the gauge becomes conducting throughout the cycle rather than only on half cycles of the impressed potential. That is, a discharge having been initiated, for example, as when plate 26 is positive, the discharge will be sustained by plate 31 becoming positive so that the discharge is continuous, and the flow of current is a full wave current rather than a half wave. The fault of similar heretofore known gauges, that is, that they would fail to fire or that is, ignite on some "ring-positive" half cycles at very low pressures is considerably reduced.

In the particular gauge disclosed in Fig. 1, the plates were thin metal plates approximately two inches square, and they were about 0.25 inch apart. The openings in the two interleaved plates were 1.0 inch in diameter and the two openings were coaxially aligned. The impressed voltage was an A. C. voltage of 2,000 volts at a frequency of 60 cycles. Various voltages and frequencies may be used.

Referring to Figs. 1 and 3 of the drawings, a second form of our invention is shown wherein the geometry of the electrodes is modified; the objective of the modification will become apparent from the following description. In Fig. 2 the gauge is shown partly disassembled, and Fig. 3 shows it assembled.

In the form of Figs. 2 and 3 there are four electrode plates, 225, 231, 226 and 230 lying in parallel planes and spaced from each other in the direction of the magnetic field (indicated by the arrow) as in Fig. 1. All the plates are circular, plate 231 having a circular central opening 232 as shown and plate 226 being a disc of substantially the same size as the opening 232. Plate or disc 226 is supported from plate 230 by a rod as shown. Plates 225 and 231 are attached to each other by a strip of wire mesh which is soldered to the plates to form a cylindrical structure as shown. The cylindrical structure is supported by a rod 214 which is soldered to plate 225 and which forms an electrical lead. Plates 226 and 230 are supported by a rod 215 which forms an electrical lead and an A. C. potential of 2000 v., for example, is impressed between the leads 214 and 215. Thus plates 225 and 231 are of polarity opposite to the polarity of plates 226 and 230.

Fig. 3 shows the parts in assembled relationship. Disc 226 is centrally located within the cylindrical structure formed by plates 225 and 231 and the wire mesh, its supporting rod extending through opening 232. All the plates are substantially equally spaced from each other. It will be observed that disc 226 and plate 231 are of opposite polarity and plates 225 and 230 are of opposite polarity. Plates 226 and 231 are each between two plates having polarity opposite to itself.

The operation of the form of the invention of Figs. 2 and 3 is very similar to that of Fig. 1. The principal difference is that in Figs. 2 and 3 the oscillating electrons move between plates 225 and 231 which has an opening, and between plate 230 and plate 226 which is a disc. That is, the electrodes 231 and 226 which can be spoken of as anodes, comprise a disc and a plate with an opening aligned with the disc. Thus, the discharge is, in one instance or on one "half" of the gauge, to the disc 226 and in the other instance, or on the other "half" of the gauge to the edges of opening 232. The electrons oscillating between plates 226 and 230 move through opening 232 to disc 226, electrons oscillating between plates 225 and 231 move around disc 226 to the edges of opening 232. Thus, there is achieved to a greater extent, a geometry consisting of parallel plates of the same polarity between which electrons can oscillate without undue obstruction, the electrodes which operate as anodes being formed to serve this purpose. The two regions of oscillating electrons, however, are closely adjacent as in the previous embodiment so that the purpose of the device is achieved, that is, of causing the gauge to fire on all positive half cycles of each "ring" electrode down to very low pressures.

It will be understood that in the foregoing description the device might be referred to as an "instrument" rather than a "gauge" since it may be used either for measuring pressures or as a control device.

It is to be understood that all matters contained in the above description and examples are illustrative only and do not limit the scope of this invention, as it is intended to claim the invention as broadly as possible in view of the prior art.

We claim:

1. A vacuum gauge comprising an envelope having an opening for admitting gas, means therewithin forming a plurality of plane electrodes disposed in parallel relationship, means forming a magnetic field perpendicular to the plane of the electrodes, alternate electrodes being connected to form pairs and the two intermediate electrodes having openings therethrough in coaxial alignment and means for impressing an A. C. potential between the pairs so that the two intermediate electrodes are of opposite polarity and the discharges between the electrodes are such that a full wave alternating current is conducted by the gauge which is proportional to the pressure in the vicinity thereof.

2. A vacuum gauge comprising an envelope having an opening for admitting gas, means therewithin forming a plurality of plane electrodes lying in parallel planes, two of the adjacent intermediate electrodes having circular coaxially aligned openings therethrough, means connecting an A. C. potential to the electrodes so that the two electrodes having openings therethrough are of opposite polarity and so that the electrodes on each side of those having an opening therethrough are of polarity opposite to the polarity of the electrode between them, means for producing a magnetic field which is in a direction perpendicular to the plane of the electrodes so that a glow discharge is produced which is in a direction along the axis of the aligned openings in the intermediate electrodes, the current flow through the gauge being a full wave alternating current.

3. In a vacuum gauge, in combination, an envelope having an opening for admitting gas, means therewithin forming two pairs of parallel plates each pair having one plate interleaved between the plates of the other pair, each of the said interleaved plates having a circular opening therethrough aligned with the opening in the other interleaved plate, means for producing a magnetic field which is perpendicular to the plates, means for impressing an A. C. potential between the pairs whereby the plates having openings therethrough are opposite in polarity, and each plate having an opening therethrough is between two plates having polarity opposite thereto whereby a glow discharge is produced which is in a direction through the openings in the interleaved plates and the gauge conducts a full wave alternating current which is proportional in magnitude to the pressure in the vicinity of the gauge.

4. In a vacuum gauge, in combination, an envelope having an opening for admitting gas, means therewithin forming a plurality of electrodes, two of said electrodes having substantially circular aligned openings therein, means for producing a magnetic field in the direction of the axis of said openings, means forming a source of A. C. potential connected to said electrodes and said two electrodes being connected to opposite sides of said source so that they are opposite in polarity, at least some of the electrodes of one polarity being on opposite sides of an electrode having an opening therein and of the other polarity whereby oscillations are set up in the region of the opening and a glow discharge is produced which is in a direction along the axis of said aligned openings so that each of said two electrodes acts as an anode on that half of the cycle when it is positive and conducts a current, the gauge as a whole thereby conducting a full wave alternating current.

5. In a vacuum gauge, in combination, an envelope having an opening for admitting gas, means therewithin forming a plurality of electrodes, two of said electrodes having substantially circular openings therethrough, means for producing a magnetic field which is in a direction substantially parallel to the axis of said openings, means forming a source of A. C. potential, means for connecting said two electrodes to opposite sides of said source whereby they have opposite polarity, certain of the electrodes being on opposite sides of an electrode having an opening and so connected to said source as to have polarity opposite to the electrode between them whereby oscillations are set up in the region within the opening and a glow discharge is produced, the said two electrodes operating as anodes and each conducting current on the half cycle when it is positive so that the gauge as a whole conducts a full wave alternating current.

6. In a modified Phillips gauge, in combination, an envelope having an opening for admitting gas, means therewithin forming a plurality of electrodes, two of said electrodes having openings to permit oscillating electrons to move therethrough, means producing a magnetic field in the direction of the axis of said openings, a source of A. C. potential, said two electrodes being connected to opposite sides of said source, each electrode having an opening being between two electrodes having polarity opposite thereto, and said two electrodes being adjacent whereby firing of the gauge on the positive half cycle of one of said two electrodes tends to induce firing on the positive half cycle of the other of said two electrodes.

7. In a modified Phillips gauge, in combination, an envelope having an opening for admitting gas, means therewithin forming a plurality of electrodes, means producing a magnetic field, two adjacent electrodes having a formation to permit oscillating electrons to move therethrough or there-past, said electrodes being spaced from each other in the direction of the field, a source of A. C. potential, said two electrodes being connected to have opposite polarity and each being between electrodes of polarity opposite to itself whereby firing of the gauge on the positive half cycle of one of said two electrodes tends to induce firing on the positive half cycle of the other of said two electrodes.

8. In a pressure measuring device, in combination, an envelope having an opening for admitting gas, means therewithin for producing a magnetic field, means within said envelope comprising a plurality of electrodes spaced from each other in the direction of said field, means forming a source of A. C. potential, connecting means whereby two adjacent intermediate electrodes have polarity opposite to each other and each has polarity opposite to another adjacent electrode whereby each of said two electrodes is between two electrodes having polarity opposite to itself, and each of said two electrodes having relatively less area transverse to the magnetic field than the other electrodes so as to permit oscillating electrons to move between the electrodes on its opposite sides whereby there is a continuous glow discharge with each of said two electrodes conducting current on its positive half cycle.

9. In a pressure measuring device, in combination, an envelope having an opening for admitting gas, means for producing a magnetic field, means within said envelope comprising a plurality of electrodes spaced from each other in the direction of said field, means forming a source of A. C. potential, connecting means whereby two adjacent intermediate electrodes have polarity opposite to each other and each has polarity opposite to another adjacent electrode whereby each of said two electrodes is between two electrodes having polarity opposite to itself, said other electrodes being flat plates lying in a plane perpendicular to the direction of the field and each of said two electrodes having relatively less area transverse to the magnetic field than the other electrodes to provide space for oscillating electrons to move from one side thereof to the other in the region between its adjacent electrodes whereby there is a continuous glow discharge with each of said two electrodes conducting current on its positive half cycle.

10. In a pressure measuring device, in combination, an envelope having an opening for admitting gas, means for producing a magnetic field, means within said envelope comprising a plurality of electrodes spaced from each other in the direction of said field, means forming a source of A. C. potential, connecting means whereby two adjacent intermediate electrodes have polarity opposite to each other and each has polarity opposite to another adjacent electrode whereby each of said two electrodes is between two electrodes having polarity opposite to itself, one of said two electrodes being a flat plate lying in a plane perpendicular to the direction of said field and having an opening therethrough and the other being a flat plate lying in a parallel plane and being of substantially the same shape as said opening and aligned therewith so that oscillating electrons can move past or through said two electrodes in the region between their adjacent electrodes whereby there is a continuous glow discharge with each of two electrodes conducting current on its positive half cycle.

11. In a pressure measuring device, in combination, an envelope having an opening for admitting gas, means for producing a magnetic field, means within said envelope forming a plurality of electrodes spaced from each other in said field, means forming a source of A. C. potential connected to said electrodes, said electrodes being positioned to form two regions of oscillating electrons, each being between two electrodes having the same polarity and the electrodes of one region having polarity opposite to that of the electrodes of the other region, and two of the electrodes having polarity opposite to each other being positioned in said regions of oscillating electrons so that each conducts a current on its positive half cycle.

12. In a device of the character described, in combination, an envelope having an opening for admitting gas, means within said envelope comprising two U-shaped members, one leg of each member being interleaved between the legs of the other member and each said one leg having an opening therethrough to allow passage of oscillating electrons, means forming a magnetic field having a direction perpendicular to the legs of said members, a source of A. C. potential connected to said members such that the members have opposite polarity whereby each leg having an opening is between legs having polarity opposite to itself, one of the legs having an opening being positive on each half cycle of the applied voltage whereby a current is conducted on both half cycles of the applied voltage.

13. In a device of the character described, in combination, an envelope having an opening for admitting gas, a source of potential, means within said envelope comprising a plurality of electrodes including two having opposite polarities, means for producing a magnetic field in the region of said electrodes, said plurality of electrodes including electrodes adjacent to said two electrodes and of polarity opposite to them, the magnetic field being at a substantial angle to the electric field between electrodes, the relative electrode positions being such that each of said two electrodes is between electrode surfaces having polarity opposite to itself, so that each of said two electrodes is in a region wherein electron oscillation occurs.

14. In apparatus of the character described, in combination, an envelope having an opening for admitting gas, means producing a magnetic field, a source of potential, means forming a plurality of electrodes connected to said source, some having one polarity and some the opposite polarity, at least two electrodes having opposite polarity being positioned between electrode members of the other polarity and spaced therefrom and the magnetic field being at a substantial angle to the electric field between electrodes so as to produce an oscillating volume of electrons, said two electrodes having relatively less surface area transverse to said oscillating volumes than other electrodes.

15. In a device of the character described, in combination, an envelope having an opening for admitting gas, a plurality of electrodes in said envelope, of source of potential connected to said electrodes, means producing a magnetic field in the vicinity of the electrodes, said electrodes being positioned in spaced relation to form a first geometric pattern consisting of two electrode surfaces having the same polarity spaced from each other with an electrode of the opposite polarity interposed between them, the magnetic field being at a substantial angle to the electric field between electrodes, said electrodes being positioned to form a second geometric pattern consisting of two electrode surfaces of the same polarity spaced from each other with an electrode of the opposite polarity interposed between them, the magnetic field being at a substantial angle to the electric field between electrodes, the corresponding electrodes of the two patterns being opposite in polarity, and said two interposed electrodes having relatively small transverse area as respects electrons oscillating metween adjacent electrode surfaces.

16. An electrode structure comprising a plurality of electrodes connected to a pair of terminals, a source of power connected to the terminals, means forming a magnetic field, said electrodes including two connected to opposite terminals, said plurality of electrodes including electrodes adjacent to said two electrodes and connected to have polarity opposite to them, the relative electrode positions being such that each of said two electrodes is between electrodes connected to have polarity opposite to itself and all said electrodes being positioned in the magnetic field so that the direction of the magnetic field is at a substantial angle to the electric field between electrodes of opposite polarity.

17. The structure as in claim 16 formed by two interleaving U-shaped members each of which is connected to one side of the power source.

WILLIAM R. PERRET.
THOMAS DAVIS.

REFERENCES CITED

The following references are of record in the file of this patent:

UNITED STATES PATENTS

| Number | Name | Date |
| --- | --- | --- |
| 2,081,429 | Gaede | May 25, 1937 |
| 2,182,736 | Penning | Dec. 5, 1939 |
| 2,197,079 | Penning | Apr. 16, 1940 |
| 2,383,600 | Grosdoff | Aug. 28, 1945 |

Certificate of Correction

Patent No. 2,506,431      May 2, 1950

WILLIAM R. PERRET ET AL.

It is hereby certified that errors appear in the printed specification of the above numbered patent requiring correction as follows:

Column 3, line 22, after the word "electrode" insert *plates*; line 75, strike out "collisions will reach plate 31, this plate" and insert instead *collision with a gas molecule is increased*; column 4, line 7, for "react" read *reach*; column 5, line 3, for "Figs. 1 and" read *Figs. 2 and*;

and that the said Letters Patent should be read with these corrections therein that the same may conform to the record of the case in the Patent Office.

Signed and sealed this 29th day of August, A. D. 1950.

[SEAL]

THOMAS F. MURPHY,
*Assistant Commissioner of Patents.*